Feb. 9, 1954     E. A. RUTENBER     2,668,899
RANGE TOP BURNER PAN AND ELECTRIC RESISTANCE SUPPORT
Filed March 20, 1951
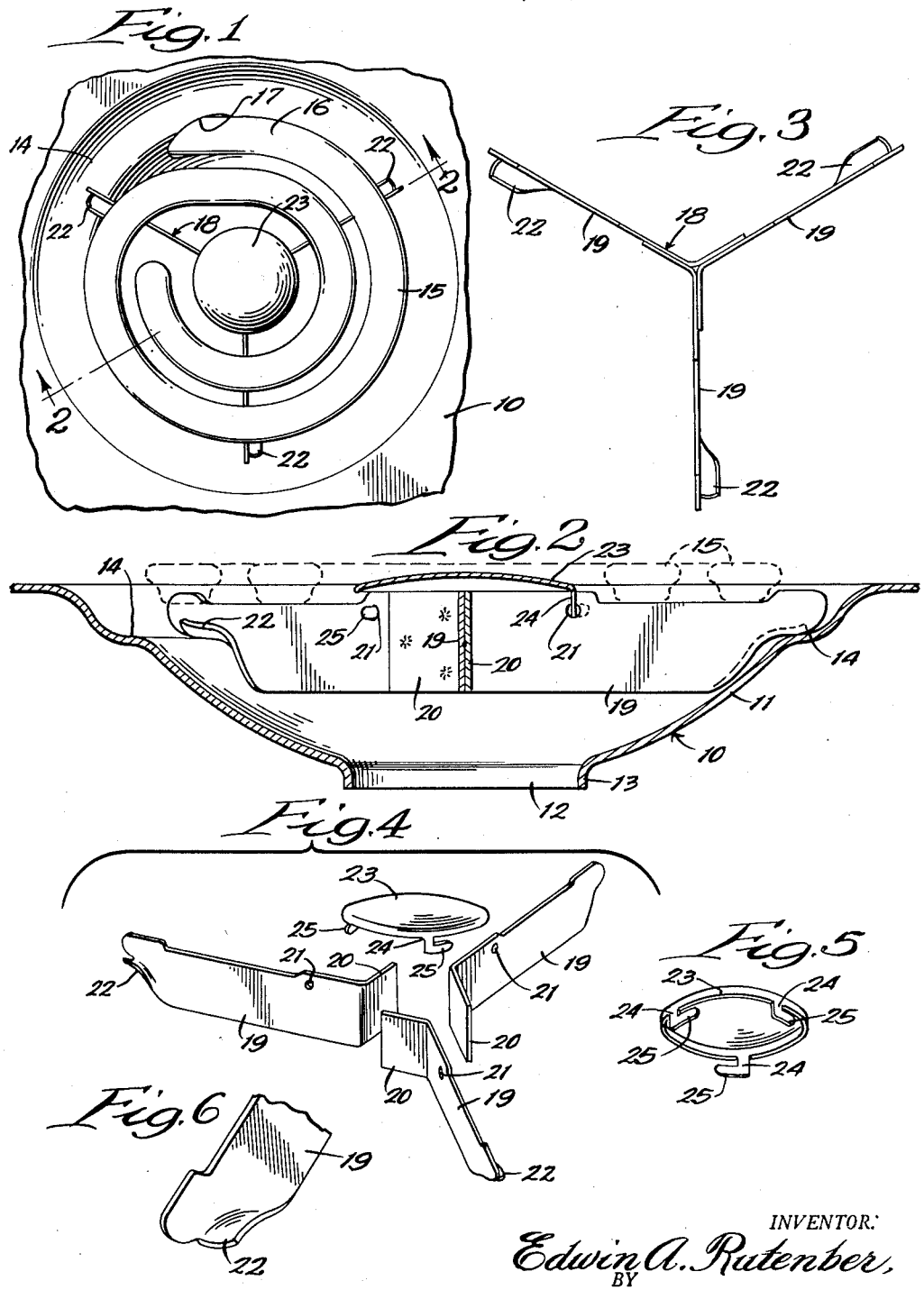
INVENTOR.
Edwin A. Rutenber,
BY
Dawson & Ooms,
ATTORNEYS.

Patented Feb. 9, 1954

2,668,899

UNITED STATES PATENT OFFICE 2,668,899

RANGE TOP BURNER PAN AND ELECTRIC RESISTANCE SUPPORT

Edwin A. Rutenber, Baldwin Lake, Mich., assignor to Gibson Refrigerator Company, Greenville, Mich., a corporation of Michigan Application March 20, 1951, Serial No. 216,574

9 Claims. (Cl. 219—37)

This invention relates to a range top burner pan and electric resistance support. The invention is particularly useful in connection with a range having a reflector pan in which an electric resistance element is supported, and to means for supporting the resistance element therein.

In an electric range in which the range top is equipped with reflector pans, a problem is presented in supporting within the reflector pan or slightly thereabove a resistance element while at the same time supporting the element for removal to expose the pan for cleaning, and at the same time preventing the heavy resistance element and the supporting means therefor from marring the reflecting surface of the pan. If the surface of the pan should be scratched or marred, its reflective efficiency is greatly reduced, while at the same time giving the pan an unsightly appearance. At the same time, it is important to present as little as possible obstruction within the pan to the flow of liquids or juices etc. downwardly into the pan. It is important that the supporting member or spider be readily removable, while at the same time preventing it from injuring the reflector when the resistance element is dropped thereon or swung away from the reflector-pan opening. The problem is particularly a difficult one where the resistance element is pivotally mounted upon a tubular extension of the element and when a slight sidewise movement of the spider is brought about as the resistance element is swung to a raised position.

A further problem is presented with respect to the opening in the lower portion of the reflector pan which opening it is desired to shield from the direct down-flow of liquids.

An object of the present invention is to provide a range-top reflector pan adapted to receive an electric resistance element and a spider support therefor, which combined structure overcomes the difficulties above described. A further object is to provide in such a structure a spider support having thin vertical blades presenting little obstruction to the down-flow of liquids while providing arcuate or rocking base portions adapted to rest upon supporting ledges provided by the reflector pan. A further object is to provide in combination with the spider support a deflector plate shielding the aperture of the burner pan. A still further object is to provide a thin blade spider support equipped with arcuate and laterally turned base portions resting upon an annular ledge of the burner pan and a detachable deflector plate secured thereto and vertically aligned with the bottom opening of the pan. Other specific objects and advantages will appear as the specification proceeds.

The invention is shown in an illustrative embodiment by the accompanying drawing, in which—

Figure 1 is a broken top plan view of a range top and a burner pan provided thereby; Fig. 2, a sectional view, the section being taken as indicated at line 2—2 of Fig. 1; Fig. 3, a top plan view of the spider or support for the resistance element; Fig. 4, a perspective view of the blades composing the spider and the deflector plate adapted to be attached thereto; Fig. 5, a perspective view of the bottom portion of the deflector plate; and Fig. 6, a broken perspective view of the end portion of one of the spider arms.

In the illustration given, 10 designates the range top which has a portion thereof depressed to form a burner pan 11. The burner pan, in the illustration given, is provided centrally with an outlet or bottom opening 12, the pan portion about the opening providing a substantially vertically extending flange border 13.

The burner pan 11 is preferably indented in its upper portion to provide an annular supporting ledge or surface 14. The reflector burner pan thus formed may be integral with the range top and may consist of a bright metal having in itself high reflective characteristics or, if desired, the metal surface may be covered by any desired reflective coating. Further, if preferred, the burner pan may be provided with a vitreous enamel covering which is not only reflective of heat but also provides a surface that may be cleaned with a minimum of effort.

The electric resistance element 15 may be of any suitable type or construction. In the illustration given, a resistance coil 15 is provided laterally with a downwardly extending tubular portion 16 which extends through an opening 17 in the reflector pan and which is supported for rotation. Such supporting structure is of well-known construction and need not be described in detail. The structure is shown in detail in the copending application of Charles J. Gibson, Serial No. 83,481, for Range Top Structure, now Patent No. 2,633,523.

To support the resistance element 15 in the upper portion of the reflector pan, I provide a spider 18 which is the specific illustration given is formed of three thin blades 19, each blade having its inner portion provided with an angularly turned flange 20. When the flanges are brought together, as illustrated in Fig. 3, the overlapping angular portions of each blade are welded to the body portion of the adjacent blade to provide an integrated structure. Each of the blades 19 is provided with an aperture 21 near its upper central portion for the purpose which will be later described.

Each blade arm 19 has the lower corner portion of its outer end turned laterally to form an arcuate or rocker base portion 22 adapted to rest upon the annular support surface 14 of the pan 10. By providing the laterally turned or arcuate portion 22 resting upon the surface 14, a rocking of each arm is made possible when the spider is being removed from the pan or inserted therein. No sharp edges are thus brought into engagement with the reflector surface when the heavy resistance element is dropped upon the spider and in the removal of the resistance element, any lateral pressure upon the spider causes it to tilt without marring the reflector surface.

A deflector plate 23 is provided with downwardly extending leg portions 24 having forwardly extending lugs 25. The lugs 25 are received within the apertures 21 in the upper portion of the blades to latch the deflector plate firmly in position, as illustrated more clearly in Fig. 2. The deflector plate provides a ready handle to facilitate the removal of the spider structure while at the same time shielding the bottom opening 12 from the direct down-flow of liquids. Liquids falling against the deflector plate 23 are directed laterally from the side walls of the pan 10.

It will be understood that the spider 18 may be formed in a number of ways and from different types of metal stock. I have found, however, that the blade structure employed is highly satisfactory in that the angular end portions of the blades are firmly secured by spot welding while the thin-blade portions extending beyond the deflector plate 23 present very slight obstructive surfaces to the down-flow of liquids etc. At the same time, however, the thin vertical blade structure provides an extremely sturdy support for receiving the heavy resistance element 15 and the laterally turned bottom portions 22 thereof distribute such heavy weight evenly over relatively wide surfaces of the ledge 14 and tend to rock thereon to protect the surface from marring, etc.

*Operation*

In the operation of the structure, the resistance element 15 may be swung upon the tubular portion 16 to a raised position and the spider 18 removed so that the reflector surface may be wiped or otherwise cleaned. The spider 18 may then be replaced in position with the arcuate surface 22 resting upon the ledge or support surface 14 of the pan. The resistance element may then be lowered upon the spider and the reflector pan is protected by the laterally turned arcuate surfaces 22 of the spider. It will be understood that the arcuate surfaces may be provided so as to fall directly below the blades 19 or at one side thereof as illustrated. Any lateral movement of the spider as the resistance element 15 is being tilted toward vertical position merely causes the spider to rock upon its arcuate surfaces and enables the spider to be readily lifted from the pan without scratching or marring it.

Should liquids be spilled from a vessel resting on the resistance element 15 and should the liquids flow inwardly toward the center of the bottom of the vessel, the deflector plate 23 catches such liquids and directs them laterally against the walls of the pan 10. Any falling of liquid from the pan 11 into the tray therebelow is from the lower edges of the pan itself, the fall of the liquid being broken by the pan and the liquid flowing downwardly along the sides of the pan and off the vertical lower flange 13 thereof.

While in the foregoing specification I have set forth a specific structure in considerable detail for the purpose of illustrating one embodiment of the invention, it will be understood that such details of structure may be varied widely by those skilled in the art without departing from the spirit of my invention.

I claim:

1. In combination with a range top having a reflector pan indented to provide supporting shelf surfaces in the upper portion thereof, a spider consisting of a plurality of thin, vertically-extending blades united at the center of the spider and having their outer ends turned laterally at the bottoms thereof to provide arcuate bases of greater width than the width of the blades resting upon said reflector pan supporting surfaces and spaced from the vertical wall portion of the reflector pan, said arcuate bases being rockable on said supporting surfaces, and an electrical heating element freely supported by said spider.

2. In combination with a range top having a reflector pan indented near the top portion thereof to provide downwardly-inclined shelf surfaces for supporting a spider thereon, a spider comprising a plurality of thin, vertically-extending blade arms united at the center of the spider, said blades at their outer ends having upwardly- and laterally-inclined bases of greater width than said blades and resting upon the inclined shelf portion of said reflector pan at points inwardly of the surrounding wall portion of said reflector pan, said bases being rockable and slidable with respect to said inclined shelf portion, whereby said base portions of the spider may move in a direction lengthwise of a blade upwardly and downwardly along said inclined surface, and an electric heating element freely supported by said spider.

3. In combination with a range top having a reflector pan indented to provide shelf-supporting portions having slightly upwardly-inclined seats enclosed by a receding reflector pan wall, a plurality of vertically-extending blade arms merging at the center of the spider, the outer ends of said arms being turned laterally to provide upwardly- and laterally-inclined bases of greater width than the width of said blades and resting upon said seats, said bases being rockable and slidable with respect to said inclined shelf, and an electrical heating element freely supported by said spider.

4. The structure of claim 3, in which the bases are arcuate in cross-section.

5. In combination with a range top having a reflector pan indented near the upper portion thereof to provide a spider-supporting surface, a spider comprising a plurality of thin vertically-extending blade arms united at the center of the spider, said arms having their outer ends equipped with broad bases wider than the blades and rockably resting on said supporting surface, and an electrical heating element freely supported by said spider.

6. In combination with a range top having a reflector pan indented to provide relatively horizontal supporting surfaces in the upper portion thereof, a spider comprising a plurality of thin vertically extending blade arms merging at the center of the spider, said arms having their outer ends turned at the bottom to provide bases resting on said surfaces, said arms also having arcuate portions extending downwardly below said surfaces and lying in sliding relation with the adjacent surfaces of said reflector pan, and an electrical heating element freely supported by said spider.

7. In combination with a range top having a reflector pan with relatively horizontal supporting surfaces in the upper portion thereof and downwardly and inwardly extending surfaces below said supporting surfaces, a spider comprising a plurality of vertically extending blade arms merging at the center of the spider, said arms having their outer ends turned at the bottom to provide arcuate bases resting on said horizontal supporting surfaces, said arms also having extending downwardly below said supporting surfaces portions turned laterally and in sliding relation to the adjacent surfaces of the reflector pan, and an electrical heating element freely supported by said spider.

8. In a range having a range top depressed to provide an integral reflector pan, said pan being provided with an aperture in its side wall and with an annular supporting ledge in the upper portion thereof, a resistance element in the form of a coil and having a lateral portion thereof extending through said pan aperture to permit rotation of the resistance element within said aperture, a separate spider equipped with laterally extending arms adapted to receive said resistance element, said arms having their lower portions turned to provide arcuate surfaces resting upon the horizontal supporting surfaces, said arms also having arcuate portions extending downwardly below said supporting surfaces and lying in sliding relation to the adjacent surfaces of the reflector pan.

9. In combination with a range top having a reflector pan indented to provide a relatively horizontal supporting surface in the upper portion thereof, a spider comprising a plurality of thin vertically extending blade arms merging at the center of the spider, said arms having at their outer ends bases resting on said horizontal supporting surface, said arms also having portions extending downwardly below said supporting surface and lying in sliding relation to the adjacent surfaces of the reflector pan, and an electrical heating element freely supported by said spider.

EDWIN A. RUTENBER.

References Cited in the file of this patent

UNITED STATES PATENTS

| Number | Name | Date |
|---|---|---|
| 2,392,692 | Price | Jan. 8, 1946 |
| 2,502,988 | Price | Apr. 4, 1950 |
| 2,506,554 | Tuttle | May 2, 1950 |
| 2,515,579 | Allen | July 18, 1950 |

FOREIGN PATENTS

| Number | Country | Date |
|---|---|---|
| 446,121 | Great Britain | Apr. 24, 1936 |